SYSTEM FOR TRANSLATING A D.C. COMPONENT

Filed June 7, 1955 4 Sheets-Sheet 1

ADRIAN J. DEVRIES
INVENTOR.

BY Francis W. Crotty

HIS ATTORNEY.

Oct. 27, 1959 A. J. DE VRIES 2,910,527

SYSTEM FOR TRANSLATING A D.C. COMPONENT

Filed June 7, 1955 4 Sheets-Sheet 2

ADRIAN J. DEVRIES
*INVENTOR.*

BY Francis W. Crotty

HIS ATTORNEY.

Oct. 27, 1959 A. J. DE VRIES 2,910,527

SYSTEM FOR TRANSLATING A D.C. COMPONENT

Filed June 7, 1955 4 Sheets-Sheet 3

ADRIAN J. DEVRIES
*INVENTOR.*

BY Francis W. Crotty

HIS ATTORNEY.

Oct. 27, 1959 A. J. DE VRIES 2,910,527

SYSTEM FOR TRANSLATING A D.C. COMPONENT

Filed June 7, 1955 4 Sheets-Sheet 4

ADRIAN J. DEVRIES
*INVENTOR.*

BY Francis W. Crotty

HIS ATTORNEY.

United States Patent Office 2,910,527

Patented Oct. 27, 1959

2,910,527

SYSTEM FOR TRANSLATING A D.C. COMPONENT

Adrian J. De Vries, Oak Park, Ill., assignor to Zenith Radio Corporation, a corporation of Delaware Application June 7, 1955, Serial No. 513,868

8 Claims. (Cl. 178—5.1)

This invention pertains to a system for translating an intelligence signal which has both an A.C. or alternating and a D.C. or unidirecitonal component. While the invention is applicable to any system where it is desired to transmit and reproduce a D.C., unidirectional or very low frequency component, it has particular application tio a distortion problem which may be encountered in a subscription television system and will be described in that environment.

In copending application Serial No. 513,757, filed concurrently herewith, and issued February 3, 1959, as Patent 2,872,507, in the name of Walter S. Druz, and assigned to the present assignee, an arrangement is disclosed for transmitting and reproducing the D.C. component as well as the A.C. component of an audio signal which has been coded by altering some characteristic thereof, such as phase. Like the present case, the Druz arrangement avoids the distortion otherwise introduced during the decoding process when the D.C. component is not conveyed. Briefly, the D.C. component is amplitude modulated on a sub-carrier at the transmitter, preferably in a suppressed carrier type modulator, and then both the A.C. component and the D.C. modulated sub-carrier are frequency modulated on a main carrier for transmission to a receiver. There the main carrier wave is first demodulated to recover the A.C. component and the D.C. modulated sub-carrier and subsequently the D.C. component is derived by means of a second demodulator, such as a synchronous detector. The A.C. and D.C. components are then both employed in the decoding process to develop a signal which corresponds to the original uncoded audio signal.

In addition to the type distortion attributable to the loss of the D.C. component and which may be eliminated with the Druz arrangement, there is still another type of distortion that may result from the coding process. This distortion may be charged, inter alia, to the limited band width allotted to audio transmission which prevents the translation of the entire range of frequency components representing the extremely sharp amplitude excursions of the coded audio signal produced by the phase inversion of the coding operation; almost an infinite band width would actually be required to duplicate such abrupt changes. Consequently, it is difficult in effecting compensating phase inversions in the decoding process at the receiver to avoid transient distortion pulses. Moreover, the compensating phase changes in the decoding apparatus at the receiver do not always occur in exact time coincidence with the corresponding phase changes at the transmitter. Additional undesirable transient pulses are consequently generated and reflected as transient distortion in the decoded audio signal.

Transient distortion of this type occurs essentially at the instants of phase inversion in the decoding process and may be effectively removed by interposing a sampling circuit and a low-pass filter in the audio channel in accordance with the teachings of copending application Serial No. 397,176, filed December 9, 1953, in the name of Howard K. Van Jepmond, and assigned to the present assignee. The operation of the sampler may be so phased with respect to the decoding process that the decoded signal is only sampled at times other than the instants of phase inversion. In this way, the decoded signal is sampled only during those intervals when no distortion transients are present. The sampled signal is then shaped in the low-pass filter producing a distortion-free simulation of the original signal.

The present invention stems from the previous work of Druz and Van Jepmond and provides a receiver that achieves essentially the same results as both prior systems except that a considerably simpler and less expensive arrangement is used.

It is, accordingly, an object of the present invention to provide an improved and inexpensive D.C. translating system of the type disclosed in the Druz application.

It is another object of the invention to provide a simplified circuit for simultaneously achieving the results of both the Druz and the Van Jepmond systems.

It is still another object of the present invention to provide a novel arrangement for translating a D.C. or very low frequency component of an intelligence signal.

It is still another object to provide a receiver for utilizing a complex modulated main carrier wave having one modulation component comprising a sub-carrier signal representing the D.C. component of an intelligence signal and another modulation component representing the A.C. component of the same intelligence signal.

It is a still further object of the present invention to provide a receiver for utilizing a modulated main carrier wave representing an audio signal which has been subjected to a phase-inversion type of coding process and converted into a coded audio signal having an A.C. component and a D.C. component which components are individually represented by separate modulations of a main carrier wave.

A receiver, in accordance with one aspect of the invention, utilizes a complex modulated main carrier wave having one modulation component comprising a sub-carrier signal representing the D.C. component of an intelligence signal conveying certain information and another modulation component representing the A.C. component of the intelligence signal. The receiver includes demodulating means for demodulating the main carrier wave to produce a complex wave form consisting of the sub-carrier signal and the A.C. component superimposed on each other. Means coupled to the demoulating means phase inverts spaced portions of the complex wave form to develop a composite signal containing the sub-carrier signal as a component thereof. Sampling means is provided for effectively sampling the composite signal only at predetermined phase conditions of the sub-carrier component to develop an output signal consisting of the sampled portions. Finally, the receiver includes frequency selective means for shaping the wave form of the output signal to form a signal simulating the intelligence signal information.

The features of this invention which are believed to be new are set forth with particularity in the appended claims. The invention itself, together with further objects and advantages thereof, may best be understood, however, by reference to the following description when taken in conjunction with the accompanying drawings, in which:

Figure 1:
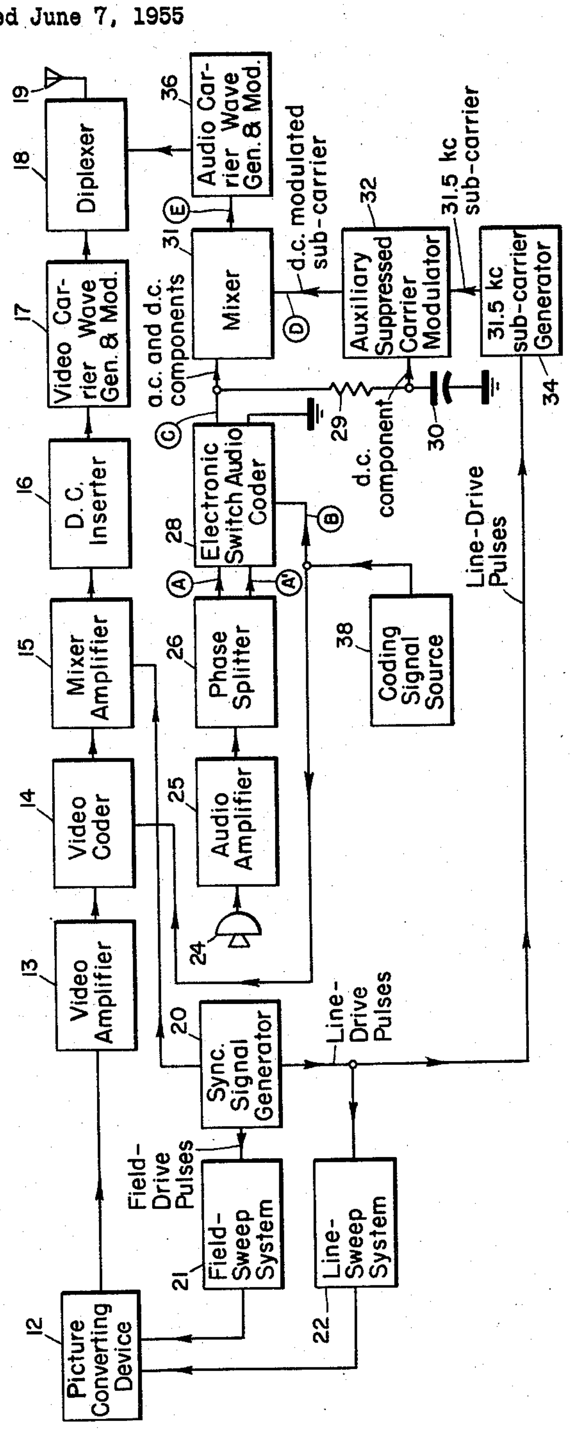
Figure 1 is a schematic representation of a subscription television transmitter as shown in the Druz application for developing a main audio carrier wave modulated by the A.C. component of the coded audio signal and also by a sub-carrier which has previously been modulated by the D.C. component of the same coded audio signal.

The transmitter of Figure 1 includes a picture-converting or pick-up device 12 which may be of any well-known construction for deriving a video signal representing the image to be televised. The output terminals of device 12 are connected through a video amplifier 13 and a video coder 14 to one pair of input terminals of a mixer amplifier 15. Video coder 14 may be similar to that disclosed and claimed in copending application Serial No. 243,039, filed August 22, 1951, issued August 7, 1956, as Patent 2,758,153, in the name of Robert Adler, and assigned to the present assignee. Coder 14 may comprise a beam-deflection tube having a pair of output circuits which may be selectively coupled into the video channel as the electron beam is deflected from one to the other of two target anodes coupled to such output circuits. One of these circuits includes a time-delay network so that the timing of the video components relative to the synchronizing components of the radiated signal varies as the beam of the deflection tube is switched between its anodes. This switching effect is accomplished by means of a beam deflection-control or actuating signal applied to video coder 14, as explained hereinafter. Such intermittent variations in the relative timing of the video and synchronizing components effectively codes the picture information since conventional television receivers, not equipped with suitable video decoding apparatus, depend upon an invariant time relation of the video and synchronizing components of a received signal to reproduce the image intelligence represented thereby.

Mixer amplifier 15 is coupled through a direct current inserter 16 to a video carrier wave generator and modulator 17 which, in turn, is connected through a diplexer 18 to an antenna 19. The transmitter also includes a synchronizing-signal generator 20 which supplies the usual line- and field-synchronizing components and associated pedestal components to mixer 15. Generator 20 further supplies field- and line-drive pulses to a field-sweep system 21 and to a line-sweep system 22, respectively. The output terminals of sweep systems 21 and 22 are connected respectively to the field-and line-deflection elements (not shown) associated with picture-converting device 12.

A microphone 24 is connected through an audio amplifier 25 to the input terminals of a phase splitter 26 which has a balanced output circuit supplying signals in push-pull relation to input circuits of an electronic switch audio coder 28. Switch 28 may be conventional in construction or may be as described and claimed in copending application Serial No. 440,224, filed June 29, 1954, and issued April 14, 1959, as Patent 2,882,398, in the name of Robert Adler, and assigned to the present assignee; it operates under the control of an applied square wave coding signal to alternately translate the audio signal to its output circuit with no phase change and with a phase inversion. A coded audio signal is developed in coder 28 which at times has a D.C. or very low frequency component.

Coder 28 is connected to one input circuit of an adder or mixer 31 and has a series-connected resistor 29 and a condenser 30 coupled across its output terminals. Condenser 30 establishes a charge potential corresponding to the D.C. component of the coded audio signal and this potential is impressed, as a modulating signal, on an auxiliary suppressed carrier, amplitude modulator 32 by virtue of a connection from the junction of resistor 29 and condenser 30 to one input circuit of the modulator. A sub-carrier oscillator 34 has its synchronizing circuit connected to synchronizing-signal generator 20 to receive line-drive pulses therefrom and has its output circuit connected to another input circuit of suppressed-carrier modulator 32 to supply a 31.5 kilocycle sub-carrier wave thereto. Oscillator 34 operates at twice the line-scanning frequency and is synchronized by the line-drive pulses.

Modulator 32 is connected to another input circuit of mixer 31 to supply thereto the 31.5 kilocycle sub-carrier wave amplitude modulated by the D.C. component of the coded audio signal. The output circuit of mixer 31 is connected through an audio carrier wave generator and modulator 36 to another input circuit of diplexer 18.

Preferably, the time constant of the circuits from which the D.C. modulated sub-carrier is derived is matched or made complementary to the time constant of the entire translating channel for the coded A.C. components from coder 28 at the transmitter to a corresponding decoder at the receiver; otherwise the rate of change of the D.C. component will be incorrect and proper compensation will not be achieved.

A coding signal source 38 supplies a square wave coding signal to audio coder 28 and also, as a deflection-control signal, to the deflection electrodes of video coder 14 in order to realize both sound and picture coding. The manner in which the coding signal is developed and information concerning its phase or other significant characteristic is conveyed to subscriber receivers is entirely immaterial to the present invention. Copending application Serial No. 366,727, filed July 8, 1953, and issued September 16, 1958, as Patent 2,852,598, in the name of Erwin M. Roschke, and assigned to the present assignee, shows one coding signal source suitable for use as unit 38. Briefly, a counting device responds to line-synchronizing pulses to develop a square wave signal having amplitude changes occurring during the line-retrace interval following each succession of 15 line-trace intervals. During the field-retrace intervals coding pulses are developed and supplied to various input circuits of a bi-stable multivibrator to effect actuation thereof, preferably in random fashion. The counting device is rephased during each field-retrace interval under the control of the bi-stable multivibrator and thus the square wave coding signal from the counter is phase modulated in a random manner. The code signal pulses may be transmitted along with the video signal during the field-retrace intervals to facilitate the proper phasing of a similar square-wave generator at the receiver.

In the operation of the described transmitter, picture-converting device 12 produces a video signal representing the program information to be televised and this signal, after amplification in video amplifier 13, is supplied through video coder 14 to mixer amplifier 15. Meanwhile, coding signal source 38 develops a square wave coding signal employed as a deflection-control signal for video coder 14 in order effectively to vary the time relationship between the video components and the synchronizing components of the radiated signal as disclosed in detail in the aforementioned Roschke application.

Mixer amplifier 15 also receives the usual line- and field- synchronizing and blanking pulses from generator 20 so that a coded composite television signal is developed therein. That signal is adjusted as to background level in direct current inserter 16 and is amplitude modulated on a picture carrier in unit 17. The modulated video carrier is supplied through diplexer 18 to antenna 19 for transmission to subscriber receivers. It will, of course, be understood that in the generation of the video components, sweep systems 21 and 22 are synchronized by the field- and line-drive pulses applied thereto by generator 20.

The audio information accompanying the video information is picked up by microphone 24 and supplied to audio amplifier 25; phase splitter 26 receives the audio signal from amplifier 25 and supplies it in push-pull relation to unit 28 wherein audio coding takes place.

Figure 3:
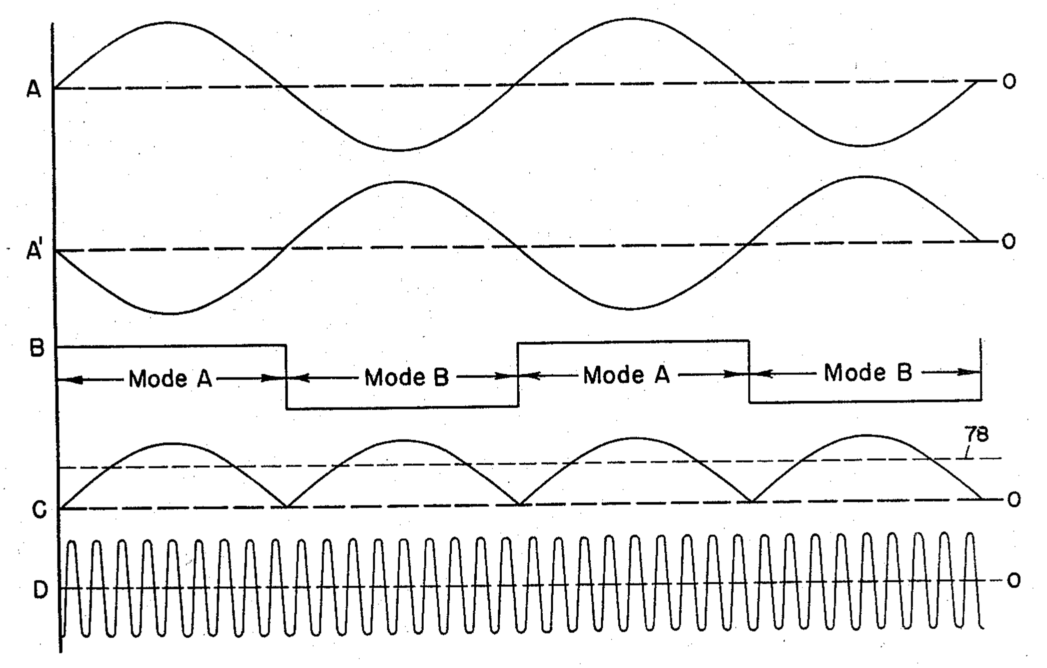
Figures 3 and 4, taken together with Figure 4 placed immediately below Figure 3, constitute a family of curves used in explaining the operation of the system.
Figure 4:
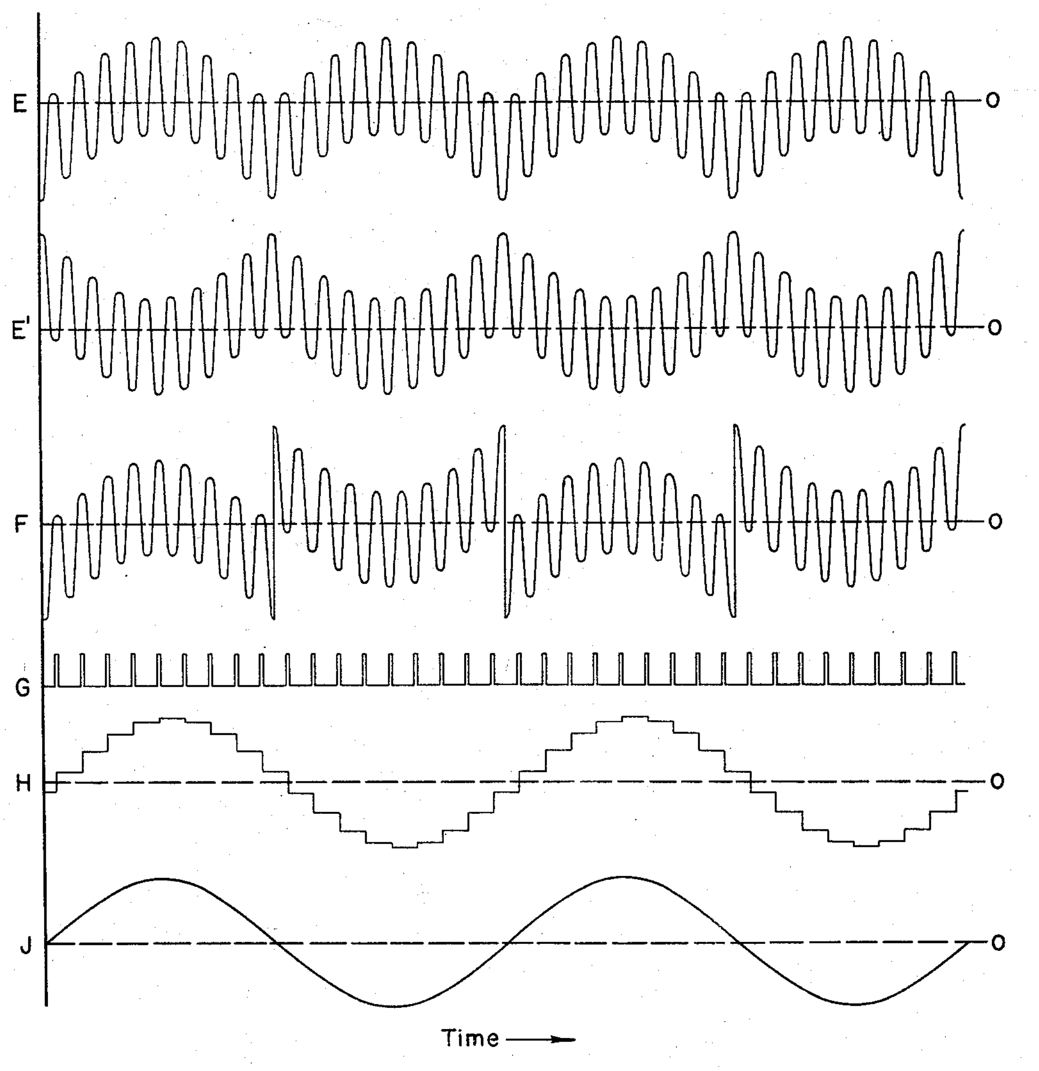

In order to simplify a detailed explanation of the audio coding process, idealized signal wave forms which appear at cerain points within the audio section indicated by encircled reference letters are identified by corresponding designations in Figures 3 and 4. It will be remembered that Figure 4 should be placed immediately below Figure 3. Assume that the coding square wave signal from source 38 has a frequency of approximately 500 cycles per second and that the representative audio signal of curve A is of the same frequency. The signals of curves A and A′ represent the output of phase splitter 26 which is applied, push pull, to audio coder 28. Assume further that the amplitude changes or excursions of the coding square wave occur during certain line-retrace intervals and also substantially in time coincidence with the zero cross-over points of the signals of curves A and A′, as shown by curve B. Audio coder 28, in response to the coding square wave, translates only selected half cycles of the signals of curves A and A′, for example the positive half cycles, to its output circuit to develop therefrom the output signal of curve C. Each time a portion of the signal of curve A is selected the transmitter may be said to be established in mode A operation, whereas each time a part of the signal of curve A′ is chosen by switch 28 the transmitter may be considered to be in mode B. The time intervals of curve B have been labeled accordingly.

The signal of curve C is the coded audio and, as may be demonstrated by a Fourier analysis, has a D.C. term or component indicated by the dashed construction line 78. Condenser 30 in the output of the audio coder charges to the potential level of dashed line 78 in curve C and this potential is employed to amplitude modulate the 31.5 kilocycle sub-carrier in modulator 32. The D.C. modulated sub-carrier is shown in curve D. Of course, the scaler relationship of 31.5 kilocycles to 500 cycles has not been adhered to in curve D for convenience of illustration. For reasons which will become apparent generator 34 is so phased that a selected one of the amplitude peaks, for example the positive peak, of each cycle of the sub-carrier shown in curve D never occurs during a line-retrace interval. This may be noted particularly by observing the instantaneous amplitude of the sub-carrier of curve D at the instant the amplitude variations of curve B take place, which of course is during selected line-retrace intervals.

The D.C. modulated sub-carrier of curve D is combined with the A.C. component of the coded audio in adder 31 to develop the complex wave form of curve E which, in turn, is frequency modulated on the main sound carrier in unit 36 and applied through diplexer 18 to antenna 19 from which it is concurrently radiated with the modulated video carrier. Thus, the coded audio signal is represented by a modulated main sound carrier wave having one modulation component comprising a sub-carrier signal representing the D.C. component of the coded audio signal and another modulation component representing the A.C. component of the coded audio signal. In this manner all components of the coded signal necessary to recover the original audio at the receiver, in a manner to be explained, are included in the transmission.

Figure 2:
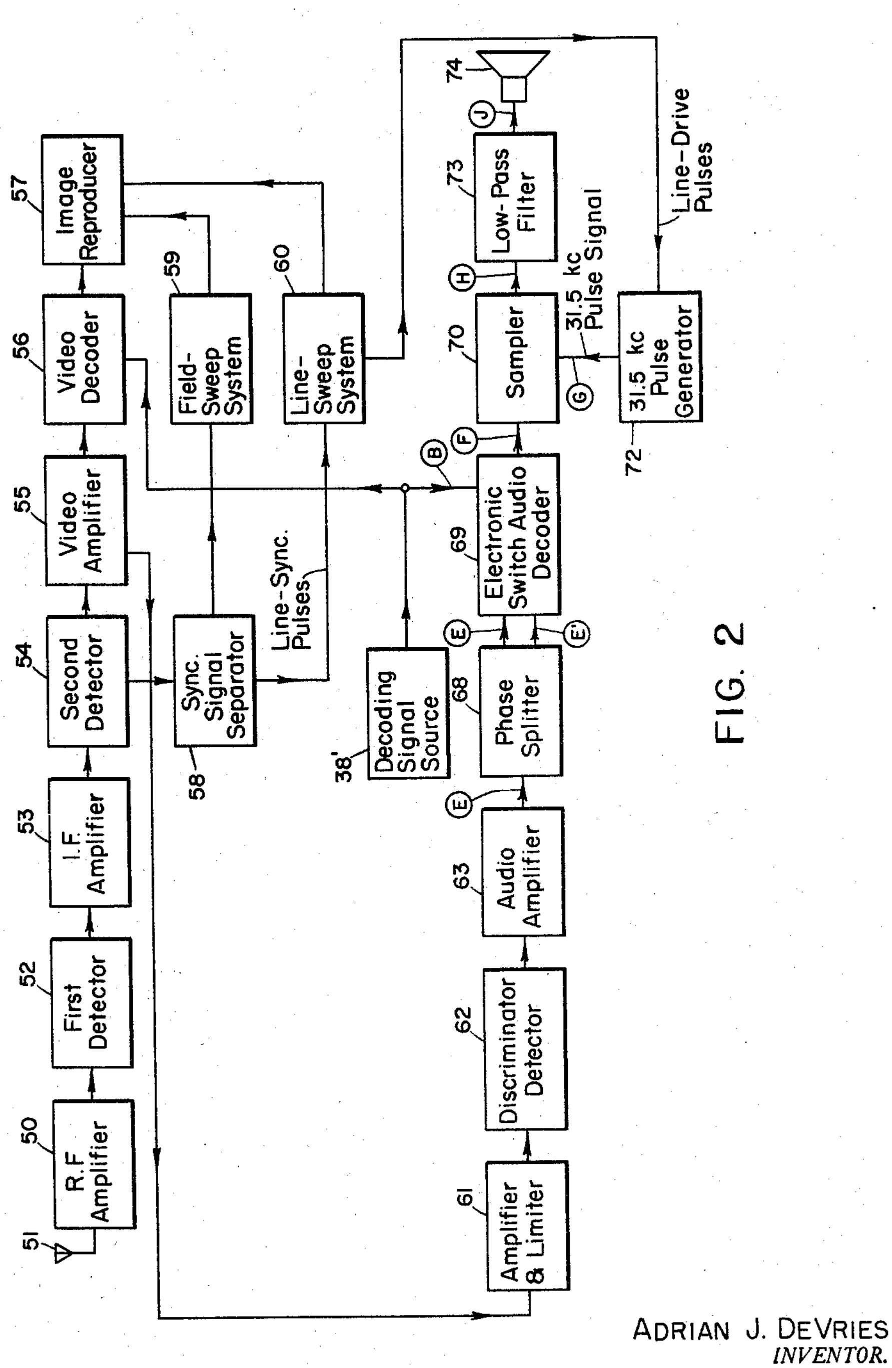
Figure 2 is a schematic representation of a subscription television receiver constructed in accordance with the invention to utilize the main carrier wave developed in the transmitter of Figure 1.

The receiver of Figure 2 is constructed in accordance with the invention to decode especially the coded audio signal radiated by the transmitter of Figure 1. It comprises a radio-frequency amplifier 50 which has input terminals connected to an antenna 51 and output terminals connected to a first detector 52. Detector 52 is connected to an intermediate-frequency amplifier 53 which, in turn, is connected to a second detector 54 having output terminals connected to a video amplifier 55. Amplifier 55 is connected through a video decoder 56 to the input electrodes of a cathode-ray image-reproducing device 57. Video decoder 56 may be similar to video coder 14 at the transmitter except that it is controlled to operate in a complementary fashion in order effectively to compensate for variations in the timing of video and synchronizing components of the received television signal.

Second detector 54 is also coupled to a synchronizing-signal separator 58 which has output circuits connected to a field-sweep system 59 and to a line-sweep system 60. The output terminals of sweep systems 59 and 60 are connected respectively to field- and line-deflection elements (not shown) associated with reproducing device 57.

Video amplifier 55 is also connected to an amplifier and amplitude limiter 61 which, in turn, is coupled through a discriminator detector or demodulator 62 to an audio amplifier 63. The output circuit of audio amplifier 63 is connected to a phase splitter 68 which has a balanced output circuit connected to respective input circuits of an electronic switch audio decoder 69 to supply the coded audio signal, including the A.C. component and the D.C. modulated sub-carrier, to decoder 69 with two different phase conditions, 180° apart. Decoder 69 may be identical in construction to coder 28 at the transmitter so that when actuated by a corresponding control or coding signal it effects compensating phase inversions of the complex wave form including the A.C. component and the sub-carrier in time coincidence with the phase inversions at the transmitter. Decoder 69 is connected to one pair of input terminals of a sampling device 70 which may be of any well-known construction. For example, sampler 70 may take either form of the sampling circuits shown in detail in the aforementioned Van Jepmond application. Line-drive pulses are derived from line-sweep system 60 and applied to a pulse generator 72 which, in turn, is connected to another input circuit of sampling device 70 to supply a 31.5 kilocycle pulse signal thereto, in order to effect sampling of a composite signal developed in the output of decoder 69. The output circuit of sampler 70 is coupled through a frequency-selective means, such as a suitable low-pass filter 73, to the input terminals of a speaker 74.

A decoding signal source 38′, similar to unit 38 of the transmitter, is connected to audio decoder 69 and to video decoder 56 to provide a square wave control signal identical to that supplied to the corresponding circuits at the transmitter. The square wave signal developed in unit 38′ may be synchronized and phased with relation to the coding square wave of the transmitter by means of signal bursts transmitted along with the television signal during vertical-retrace intervals, as is described in the aforementioned Roschke application, Serial No. 366,727. The phase-modulated square wave from source 38′ effects operation of decoder 69 during line-retrace intervals in order to realize compensating phase inversions of the coded audio during such intervals. Transient distortion may arise during phase inversion or mode changing times and, consequently, it is imperative to sample the composite signal developed in the output of decoder 69 at other than mode changing times if the technique of sampling is to be relied upon to suppress transient distortion. For this reason, the sub-carrier signal is so phased with respect to the line-drive pulses at the transmitter that the positive peak of each cycle of the sub-carrier never occurs during a line-retrace interval. Generator 72 may then likewise be so phased with respect to the line-drive pulses at the receiver that the pulses developed for sampling individually occur in time coincidence with the peaks of the sub-carrier component in the composite signal developed in decoder 69 that correspond to the positive peaks at the transmitter.

In the operation of the described receiver the coded television signal is intercepted by antenna 51, amplified in radio-frequency amplifier 50 and heterodyned to the selected intermediate frequency of the receiver in first detector 52. The resulting intermediate-frequency signal is amplified in intermediate-frequency amplifier 53 and detected in second detector 54 to produce the coded composite video signal. This latter signal is amplified in video amplifier 55, translated through video decoder 56, and impressed on the input electrodes of image reproducer 57 to control the intensity of the cathode-ray beam of the reproducing device in well-known manner. Video decoder 56 receives a decoding signal from source 38' which has amplitude variations occurring during line-retrace intervals in exact time coincidence with, but opposite in phase to, amplitude excursions of the coding signal applied as a deflection-control signal to the video coder in the transmitter so that the video components applied to the input electrodes of image reproducer 57 are suitably compensated or decoded to effect intelligible image reproduction.

The synchronizing components of the received signal are separated in separator 58, the field-synchronizing components being utilized to synchronize sweep system 59 and, therefore, the field scansion of the image reproducer while the line-synchronizing pulses are utilized to synchronize sweep system 60 and, therefore, the line scansion of device 57.

An intercarrier sound signal, which is the main sound carrier, is developed in detector 54 and separated from the video in amplifier 55 in accordance with intercarrier sound principles. The intercarrier signal is amplified and amplitude limited in unit 61, detected in demodulator or discriminator detector 62, and amplified in audio amplifier 63 to develop the complex wave form of curve E which, of course, is the same as the signal developed in the output of mixer 31 at the transmitter. The complex wave form of curve E, which contains the A.C. component of the coded audio signal and also the sub-carrier signal which has been modulated by the D.C. component of the coded audio signal, is applied to phase splitter 68 which translates the applied signal to its two output loads simultaneously and with opposing phases. Therefore, the signals of curves E and E' are developed by phase splitter 68 for application to the input circuits of decoder 69.

Decoder 69 operates in time coincidence with coder 28 at the transmitter, and in response to the decoding signal from source 38', and develops in alternation selected portions of curves E and E' in its output circuit. The composite signal developed at the output terminals of decoder 69 is shown in curve F; the composite signal is derived from the signal of curve E during mode A intervals when the control signal of curve B is positive and is derived from the signal of curve E' during mode B intervals when the control signal of curve B is negative.

From a close study of the composite wave form of curve F it may be observed that the positive amplitude peaks of the sub-carrier during mode A intervals and the negative amplitude peaks of the sub-carrier during mode B intervals actually "outline" the original uncoded audio signal of curve A. Since the signals of curves E and E' are 180° out of phase, timing sampler 70 to sample during positive peaks of the signal of curve E necessarily results in sampling during negative peaks of the signal of curve E' and produces a sampled version of the uncoded audio signal. Accordingly, generator 72 is phased by the line-drive pulses to develop the sampling pulses of curve G for application to sampler 70, occurring at a 31.5 kilocycle rate and individually occurring in exact time coincidence with the positive peaks of the sub-carrier shown in curve E. The composite signal of curve F is supplied to sampler 70 wherein it is sampled or "read" at the occurrence of each pulse of curve G and the sampler develops an output signal as shown in curve H.

The signal of curve H is applied to low-pass filter 73 wherein it is shaped to produce the signal of curve J which is a simulation of the original uncoded audio signal of curve A and, of course, is related to the coded audio signal of curve C. The signal of curve J is applied to speaker 74 and the sound intelligence is reproduced without any perceptible trace of transient distortion introduced as an incident to the decoding process or any distortion produced by an absence of the D.C. component.

By way of summary, discriminator detector 62 constitutes demodulating means for demodulating the main sound carrier wave to derive the modulation components, namely, the A.C. component and the D.C. modulated sub-carrier. Audio amplifier 63, phase splitter 68, decoder 69 and source 38', collectively may be considered means coupled to the demodulating means and responsive to the modulation components for developing a composite signal (curve F) which is a combination of the sub-carrier and the A.C. component. Generator 72 and sampler 70 constitute sampling means for effectively sampling only certain predetermined portions of the composite signal (namely, the positive peaks of the sub-carrier during the mode A intervals of curve B and the negative peaks of the sub-carrier during mode B intervals) to develop an output signal (curve H) consisting of the sampled portions. Finally, low-pass filter 73 constitutes frequency-selective means for shaping the wave form of the output signal of curve H to form a signal (curve J) related to the intelligence signal of curve C represented by the modulated main carrier.

The invention, therefore, provides an improved and simplified receiver for reproducing a D.C. component. When incorporated in a subscription television system, the arrangement prevents distortion in an audio signal which has ben coded by phase inversion as explained which distortion normally arises due to the inability of the prior art systems to reproduce and transmit the D.C. component of the coded signal.

While a particular embodiment of the invention has been shown and described, modifications may be made, and it is intended in the appended claims to cover all such modifications as may fall within the true spirit and scope of the invention.

I claim:

1. A receiver for utilizing a main carrier wave which has been modulated by a complex wave form consisting of a sub-carrier signal representing the unidirectional component of an intelligance signal conveying certain information and an alternating signal, representing the alternating component of said intelligence signal, added to said sub-carrier signal, said receiver comprising: demodulating means for demodulating said main carrier wave to derive said complex wave form; means coupled to said demodulating means for phase inverting spaced portions of said complex wave form to develop a composite signal containing said sub-carrier signal as a component thereof; sampling means for effectively sampling said composite signal only at predetermined phase conditions of said sub-carrier component to develop an output signal consisting of the sampled portions; and frequently-selective means for shaping the wave form of said output signal to form a signal simulating said information.

2. A receiver for utilizing a complex modulated main carrier wave representing an uncoded intelligence signal which has been subjected to a coding function and converted into a coded intelligence signal having an alternating component and a unidirectional component which components are individually represented by separate modulations of said main carrier wave, with the unidirectional component modulated on a sub-carrier wave, said receiver comprising: demodulating means for demodulating said main carrier wave to derive a complex waveform comprising said alternating component and the unidirectional modulated sub-carrier signal; decoding apparatus coupled to said demodulating means and responsive to said complex waveform for performing a decoding function which is complementary to said coding function to develop a composite signal including a sub-carrier component having predetermined phase conditions collectively representing said uncoded intelligence signal; sampling means for effectively sampling only said predetermined phase conditions to develop an output signal consisting of the sampled portions; and frequency-selective means for shaping the wave form of said output signal to simulate that of said uncoded intelligence signal.

3. A receiver for utilizing a complex modulated main carrier wave representing an uncoded intelligence signal which has been subjected to a coding function and converted into a coded intelligence signal having an alternating component and a unidirectional component with the unidirectional component represented by a modulated sub-carrier signal, said receiver comprising: demodulating means for demodulating said main carrier wave to derive said alternating component and the unidirectional modulated sub-carrier signal; decoding apparatus coupled to said demodulating means and responsive to said alternating component and the unidirectional modulated sub-carrier signal for performing a decoding function which is complementary to said coding function to develop a composite signal which is a combination of said sub-carrier signal and said alternating component; sampling means for effectively sampling only certain predetermined phase conditions of the sub-carrier component of said composite signal to develop an output signal consisting of the sampled portions; and frequency-selective means for shaping the wave form of said output signal to form a simulation of said uncoded intelligence signal.

4. A receiver for utilizing a complex modulated main carrier wave representing an uncoded audio signal which has been subjected to a phase inverting coding function and converted into a coded audio signal having a number of phase inversions occurring in accordance with a predetermined code schedule and having an alternating component and a unidirectional component which components are individually represented by separate modulations of said main carrier wave, with the unidirectional component modulated on a sub-carrier signal, said receiver comprising: demodulating means for demodulating said main carrier wave to derive a complex wave form comprising said alternating component and the unidirectional modulated sub-carrier signal; decoding apparatus coupled to said demodulating means for inverting the phase of said complex wave form at selected times determined by said predetermined code schedule to derive a composite signal including a sub-carrier component with certain amplitude peaks of the cycles of the sub-carrier component collectively representing said uncoded audio signal; sampling means for effectively sampling only said certain amplitude peaks of the sub-carrier component of said composite signal to develop an output signal consisting of the sampling portions; and frequency-selective means for shaping the wave form of said output signal to simulate that of said uncoded audio signal.

5. A subscription television receiver for utilizing a television transmission representing a video signal, a synchronizing signal, and an uncoded audio signal which has been subjected to a coding function and converted into a coded audio signal having mode changes determined by said synchronizing signal and having an alternating component and a unidirectional component which components are individually represented by separate modulations of said television transmission, with the unidirectional component modulated on a sub-carrier signal of said television transmission, said receiver comprising: demodulating means for deriving a complex wave form from said television transmission comprising said alternating component and the unidirectional modulated sub-carrier signal; decoding apparatus coupled to said demodulating means and responsive to said complex wave form for performing a decoding function which is complementary to said coding function to develop a composite signal including a sub-carrier component having predetermined phase conditions collectively representing said uncoded audio signal; means for deriving said synchronizing signal from said television transmission; a sampling mechanism coupled to said synchronizing signal deriving means and operated in synchronism with said synchronizing signal for effectively sampling only said predetermined phase conditions to develop an output signal consisting of the sampled portions; and frequency-selective means for shaping the wave form of said output signal to simulate that of said uncoded audio signal.

6. A receiver for utilizing a complex modulated main carrier wave representing an uncoded audio signal which has a characteristic that has been varied between a plurality of different modes during a series of mode changing intervals, with the transitions between said modes subject to introducing transient distortion, and converted into a coded audio signal having an alternating component and a unidirectional component which components are individually represented by separate modulations of said main carrier wave, said receiver comprising: demodulating means for demodulating said main carrier wave to derive said separate modulations; decoding apparatus coupled to said demodulating means and responsive to said separate modulations for performing a decoding function which is complementary to the coding function to which said uncoded audio signal has been subjected to develop a composite signal having predetermined portions thereof occurring at spaced time intervals different from said mode changing intervals and collectively representing said uncoded audio signal; sampling means for effectively sampling only said predetermined portions of said composite signal to develop an output signal consisting of the sampled portions; and frequency-selective means for shaping the wave form of said output signal to simulate that of said uncoded audio signal.

7. A television receiver for utilizing a television transmission representing a video signal, a synchronizing signal and an uncoded audio signal which has a characteristic that has been varied between a plurality of different modes during a series of mode changing intervals determined by said synchronizing signal, with the transitions between said mode subject to introducing transient distortion, and converted into a coded audio signal having an alternating component and a unidirectional component which components are individually represented by separate modulations of said television transmission, said receiver comprising: demodulating means for demodulating said television transmission to derive said separate modulations; decoding apparatus coupled to said demodulating means and responsive to said separate modulations for performing a decoding function which is complementary to the coding function to which said uncoded audio signal has been subjected to develop a composite signal having predetermined portions thereof occurring at spaced time intervals different from said mode changing intervals and collectively representing said uncoded audio signal; means for deriving said synchronizing signal from said television transmission; a sampling mechanism coupled to said synchronizing signal deriving means and operated in synchronism with said synchronizing signal for effectively sampling only said predetermined portions of said composite signal to develop an output signal consisting of the sampled portions; and frequency-selective means for shaping the wave form of said output signal to simulate that of said uncoded audio signal.

8. A television receiver for utilizing a television transmission representing a video signal, a field-synchronizing signal, a line-synchronizing signal, and an uncoded audio signal falling within a predetermined frequency band which has been phase inverted during each of a series of mode changing intervals in accordance with a predetermined code schedule and converted into a coded audio signal having an alternating component and a unidirectional component with the unidirectional component represented by a modulated sub-carrier signal of said television transmission, said receiver comprising: demodulating means for demodulating said television transmission to derive a complex wave form comprising said alternating component of the unidirectional modulated subcarrier signal; decoding apparatus for inverting the phase of said complex wave form at selected times determined by said predetermined code schedule to derive a composite signal having predetermined portions thereof occurring at spaced time intervals different from said mode changing intervals and collectively representing said uncoded audio signal; means for deriving said line-synchronizing signal from said television transmission; a sampling circuit coupled to said decoding apparatus; a pulse signal source coupled to said line-synchronizing deriving means for supplying a pulse signal to said sampling circuit for effecting operation thereof at a sampling frequency higher than the upper frequency of said predetermined band to sample only said predetermined portions of said composite signal to develop an output signal consisting of the sampled portions and also including a sampling component having a frequency corresponding to said sampling frequency; and a low-pass filter for effectively removing said sampling component from said output signal to shape the wave form of said output signal to simulate that of said uncoded audio signal.

References Cited in the file of this patent

UNITED STATES PATENTS

| | | |
|---|---|---|
| 2,567,545 | Brown | Sept. 11, 1951 |
| 2,656,406 | Gray et al. | Oct. 20, 1953 |
| 2,664,460 | Roschke | Dec. 29, 1953 |
| 2,677,721 | Bedford | May 4, 1954 |

FOREIGN PATENTS

| | | |
|---|---|---|
| 1,034,776 | France | Apr. 15, 1953 |